US011905574B2

(12) United States Patent
Jiménez Guzmán et al.

(10) Patent No.: US 11,905,574 B2
(45) Date of Patent: Feb. 20, 2024

(54) SYSTEM FOR PHYSICAL-MECHANICAL RECOVERY AND REFINING OF NON-FERROUS METALS FROM ELECTRONIC SCRAP

(71) Applicant: Francisco Javier Jiménez Guzmán, Yucatán (MX)

(72) Inventors: Francisco Javier Jiménez Guzmán, Mérida (MX); Francisco Javier Berrueta García, Mérida (MX)

(73) Assignee: Francisco Javier Jiménez Guzmán (MX)

( * ) Notice: Subject to any disclaimer, the term of this patent is extended or adjusted under 35 U.S.C. 154(b) by 739 days.

(21) Appl. No.: 17/044,474

(22) PCT Filed: May 17, 2019

(86) PCT No.: PCT/MX2019/050009
§ 371 (c)(1),
(2) Date: Oct. 1, 2020

(87) PCT Pub. No.: WO2019/221591
PCT Pub. Date: Nov. 21, 2019

(65) Prior Publication Data
US 2021/0040580 A1    Feb. 11, 2021

(30) Foreign Application Priority Data

May 18, 2018 (MX) .................. MX/a/2018/006178
May 18, 2018 (MX) .................. MX/u/2018/000253
May 18, 2018 (MX) .................. MX/u/2018/000254

(51) Int. Cl.
C22B 7/00 (2006.01)
B03C 1/30 (2006.01)
(Continued)

(52) U.S. Cl.
CPC ............ *C22B 7/005* (2013.01); *B02C 13/288* (2013.01); *B02C 23/40* (2013.01); *B03B 9/06* (2013.01);
(Continued)

(58) Field of Classification Search
CPC ... B02C 13/288; B02C 23/40; B02C 19/0062; B02C 21/00; B03B 9/06; B03C 1/30;
(Continued)

(56) References Cited

U.S. PATENT DOCUMENTS

2011/0017644 A1*  1/2011  Valerio ................... B07C 5/344
                                                           209/44.1
2013/0000532 A1*  1/2013  Rabiner .................. F23G 7/006
                                                           110/346
2017/0253946 A1*  9/2017  Peys ........................ B03C 1/02

FOREIGN PATENT DOCUMENTS

CN        109225897 A     1/2019
CN        109433414 A     3/2019
(Continued)

OTHER PUBLICATIONS

International Search Report for corresponding PCT application No. PCT/MX2019/050009 dated Oct. 14, 2019.

*Primary Examiner* — Scott R Kastler
*Assistant Examiner* — Michael Aboagye
(74) *Attorney, Agent, or Firm* — Emerson, Thomson & Bennett, LLC; Roger D. Emerson; Peter R. Detorre

(57) ABSTRACT

A system for the physical-mechanical recovery and refining of non-ferrous metals from electronic scrap, with means for the separation of the interest metals from the polymeric and resin support frames, which does not require the addition of solvents or temperature rise, for the disintegration and separation of materials, so that no toxic waste is produced for the environment.

11 Claims, 3 Drawing Sheets

Figure 1:
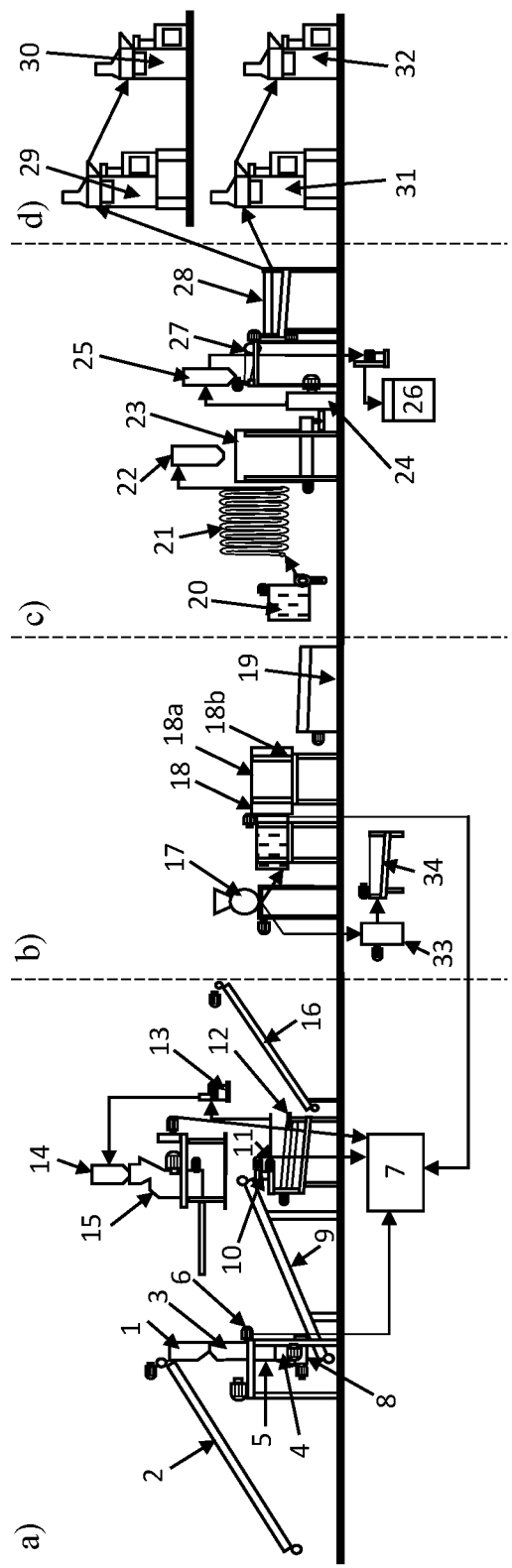

(51) Int. Cl.
  *B03C 1/247* (2006.01)
  *B09B 3/00* (2022.01)
  *B03B 9/06* (2006.01)
  *B02C 13/288* (2006.01)
  *B02C 23/40* (2006.01)

(52) U.S. Cl.
  CPC .............. *B03C 1/247* (2013.01); *B03C 1/30* (2013.01); *B09B 3/00* (2013.01); *B03C 2201/20* (2013.01)

(58) Field of Classification Search
  CPC ....... B03C 1/247; B09B 3/00; B09B 2101/15; B09B 2101/17; B09B 2101/18; B09B 5/00; C22B 7/005
  USPC ........................................................ 266/137
  See application file for complete search history.

(56) References Cited

FOREIGN PATENT DOCUMENTS

| | | | | |
|---|---|---|---|---|
| DE | 19600647 A1 | | 7/1997 | |
| JP | H11253889 | * | 9/1799 | ............... B09B 5/00 |
| JP | 2002355661 | * | 12/2002 | ............... B09B 5/00 |

* cited by examiner

SYSTEM FOR PHYSICAL-MECHANICAL RECOVERY AND REFINING OF NON-FERROUS METALS FROM ELECTRONIC SCRAP

FIELD OF INVENTION

The present invention relates to a system for the recovery of metals from electronic waste materials and more particularly, the present invention provides a system for the physical-mechanical recovery and refining of non-ferrous metals from electronic scrap, such as plates base, circuit boards, processors, memories, etc. The system for recovery and refining of the present invention allows to separate the interest metals with a high purity so that they can be reused in metallurgical processes.

BACKGROUND OF THE INVENTION

Due to the rapid development of technology in recent years, consumers are motivated to constantly swap out their old electronic equipment for new ones, in order to keep up with processing power. However, there are no clear guidelines stipulating how electronic equipment should be disposed of, resulting in the accumulation of waste electronic components in large quantities. These waste components, such as electronic cards, are not appreciated by the recycling industry, since due to their high degree of complexity they are difficult to separate into their constituent materials.

Although it is true that waste electronic components have a large proportion of non-precious metals, they also contain metals of high commercial interest such as copper, tin, aluminum, and iron, among others. To date, 90% of electronic equipment components are treated as non-recyclable waste, which is sent to landfills or open dumps, being burned, or simply thrown away without adequate confinement.

In order to find a useful destination for these waste materials, the recycling industry has opted for the use of two main groups of processes, the first is the total mechanical destruction of the cards, without a specific order or methodology, which only allows to obtain fine particles of the material that can be dispersed in sanitary landfills, while the second group of processes includes the use of chemicals for the selective dissolution of polymeric and resin substrates of electronic components such as those described for example in U.S. Pat. No. 4,619,814, EP1784515, CN204058560U, EP2456574 and U.S. Pat. No. 6,770,249. However, in most cases, chemical separation processes produce toxic residues that are highly contaminating, which limits their implementation since it requires special confinement facilities or the use of secondary inactivation processes. Additionally, but to a lesser degree, there are some pyrometallurgical processes in which electronic waste is consumed by raising the temperature in inert atmospheres, which allow the separation of metals without them undergoing chemical changes; however, these processes, such as conventional pyrolytic processes, produce a large amount of toxic gases that are difficult to handle. From the aforementioned, it is evident that the processes for the recovery of metals from electronic scrap available today, in all cases produce a large amount of waste that must be handled and reprocessed to avoid environmental contamination. However, most of the time the waste produced is directly disposed of in open-air landfills, so the toxic substances produced are dispersed in an uncontrolled manner, contaminating the soil and the groundwater table.

In view of the above, there is a need to provide a system for the recovery of non-ferrous metals from electronic waste such as cards, memories, processors and circuits, that allows the interest metals to be separated from polymeric and resin supports in which they are embedded, without the need for the use of solvents or thermal separation processes, in order to avoid the decomposition of waste materials, reducing residual contamination of the system, so that the recycling process of electronic components be friendly to the environment.

SUMMARY OF THE INVENTION

In order to overcome the limitations of the equipment and systems for the treatment of electronic waste such as cards, circuit boards and processors among others, the present invention aims to provide a system for the physical-mechanical recovery and refining of non-ferrous metals from electronic scrap.

Another objective of the present invention is to provide a system for the physical-mechanical recovery and refining of non-ferrous metals from electronic scrap, which allows an efficient separation of the interest metallic components, from the residual components of the electronic cards without considerable losses of the metals.

A further object of the present invention is to provide a system for the physical-mechanical recovery and refining of non-ferrous metals from electronic scrap, which can separate the metals even when they are embedded in resin matrices or encapsulated in polymers.

Still another object of the present invention is to provide a system for the physical-mechanical recovery and refining of non-ferrous metals from electronic scrap that does not use chemical reagents for the separation of the components of electronic scrap waste, so that it does not toxic waste is generated.

A further objective of the present invention is to provide a system for the recovery of non-ferrous metals from electronic scrap, which has means for the sequential separation of the interest components and also has means for the recovery of the interest materials from the waste outlets of the system to increase its efficiency.

Still another object of the present invention is to provide a system for the recovery of non-ferrous metals from electronic scrap, which allows the separation of the waste into separate fractions, which can be used for their integration into metallurgical processing systems.

The aforementioned, as well as other, objects and advantages of the present invention will become apparent from the following detailed description thereof.

DESCRIPTION OF THE FIGURES OF THE INVENTION

FIG. 1 shows a side view of the system for the recovery of non-ferrous metals from electronic scrap of the present invention.

Figure 2:
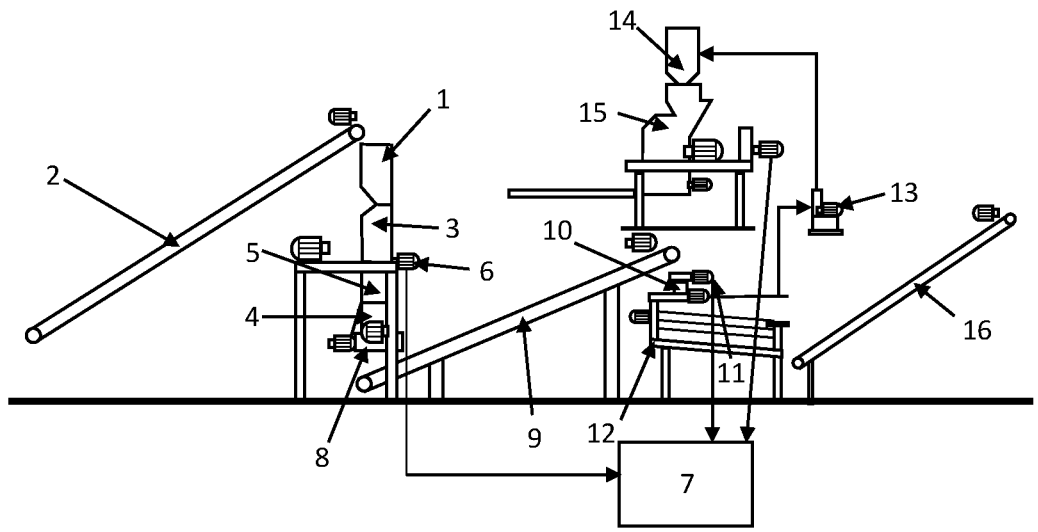
Figure 3:
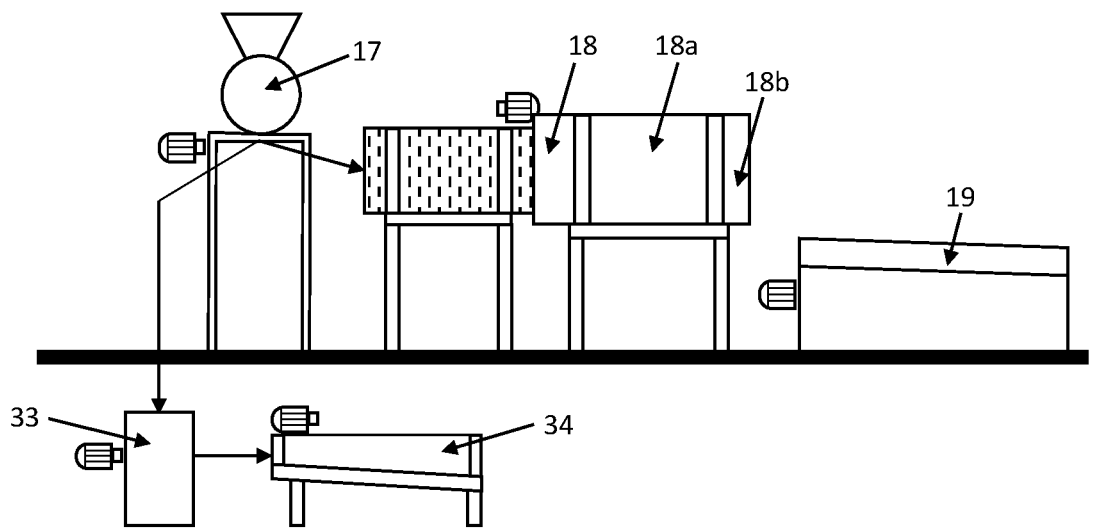
Figure 4:
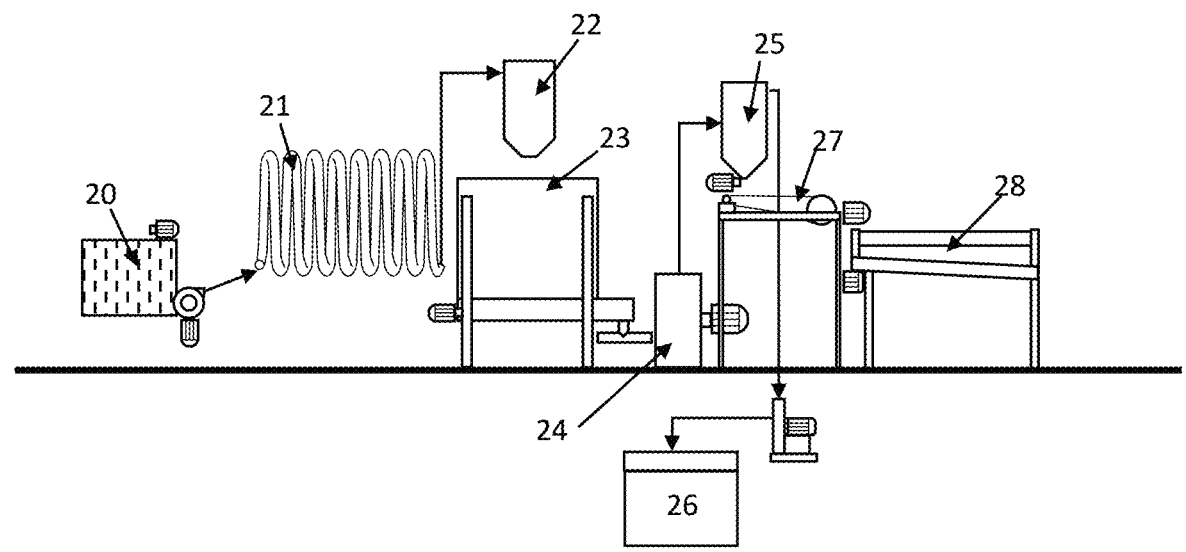
Figure 5:
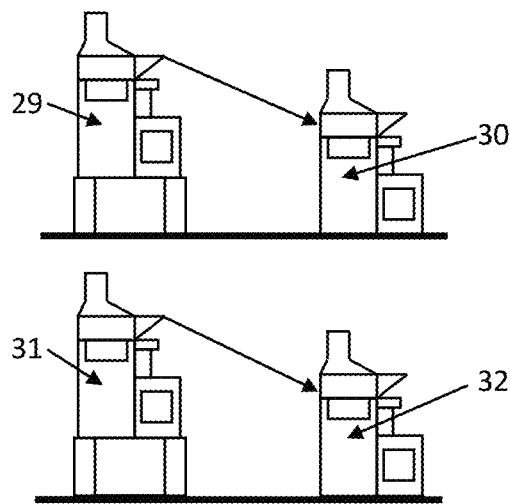

FIG. 2 shows an enlargement of section a) of FIG. 1.
FIG. 3 shows an enlargement of section b) of FIG. 1.
FIG. 4 shows an enlargement of section c) of FIG. 1.
FIG. 5 shows an enlargement of section d) of FIG. 1.

DETAILED DESCRIPTION OF THE INVENTION

The system for the recovery and refining of non-ferrous metals from electronic scrap of the present invention, is made up of a series of equipment that together allows to efficiently separate the metallic components from the waste of the support and encapsulation matrices of electronic components such as cards, memories and processors, without requiring the use of chemical solvents, so the system of the present invention does not generate waste chemical substances or produce toxic gases that could escape to the ground or water tables, so that the system of the present invention allows a completely environmentally friendly recycling process. The system of the present invention also makes it possible to obtain metallic waste such as copper and aluminum from electronic waste, with a small particle size that facilitates its handling and subsequent use in conventional metallurgical recycling processes.

To achieve the above, the system of the present invention is made up of various equipment that separates the waste sequentially, until obtaining a final residue highly enriched in non-ferrous metals such as copper and aluminum, which can be separated to obtain separate wastes containing a single non-ferrous metal.

The system for the recovery of non-ferrous metals of the present invention comprises:

A hammer mill (1), fed by a first controlled feeding conveyor belt (2), which crushes the electronic scrap waste to a homogeneous particle size, connected to an air chamber (3) of substantially rectangular shape, located at its outlet, in which the material from the hammer mill is incorporated into a wind current caused by the movement of said mill (1) for its dispersion in a separation chamber (4) that is connected through a bell (5) to said air chamber (3), where the particulate material is dispersed in an area preferably between 0.7 to 1.3 $m^3$, until it hits a rebound screen located at the bottom, which has holes between 12 to 17 mm, in such a way that the heaviest materials are deposited on it, while the lighter materials are driven back towards the separation chamber (4) by the turbulence generated by the wind current coming from the hammer mill (1), to meet a transverse air stream from a blower, with a preferential flow between 150 to 250 $m^3/h$, which redirects the lighter waste towards an outlet duct with an extractor (6) with a suction flow between 1700 to 2100 $m^3/h$, which drags said waste towards a bag filter (7);

A dosing box (8), which receives the material that passes through the holes of the rebound screen and redirects them towards a second conveyor belt (9) that deposits them in a transverse barrel feed hopper (10), with a transversal air current between 130 to 170 $m^3/h$, which intercepts the lightest materials sending them towards an outlet with an extractor (11) that generates a suction force between 1700 to 2300 $m^3/h$, which drags the materials trapped by the suction current redirecting them towards the bag filter (7);

A retention screen or mesh, placed in the bottom of the transverse barrel feed hopper (10), with a motovibrator that avoids the clogging of the heavier material that passes through it to be deposited on an oscillating screen (12) such as, for example, a Rotex® screen, in which the material free of light contaminants is classified into three sizes: large greater than 3 mm that is rejected and sent back by means of a blower (13) to a cyclone (14) that deposits it in a second mill (15) to decrease its size to re-enter it into the transverse barrel feed hopper (10); medium between 1 to 3 mm and; fine less than 1 mm, the medium and fine material being deposited on a third conveyor belt (16);

A magnetic drum (17), which receives the medium and fine-sized materials from the third conveyor belt (16), which extracts the ferrous materials to be sent to a parallel production line, depositing the non-ferrous metals on a combined rotary screen (18) to remove materials smaller than 1 mm, sending them to a wet densimetric table (18a) or wiffley table for fine powders separation and treatment, transferring the separated non-ferrous metals to a first serpentine dryer (18b) air operated, while medium materials (between 1 to 3 mm) are sent to a second stage of the combined rotary screen (18) in which they are added to a rotating drum together with water, forming a homogeneous mixture, which is transferred to a second densimetric table (19) for non-ferrous metals separation from any contaminant;

A rotary screen (20), arranged to receive non-ferrous metals with a size between 1 to 3 mm from the second densimetric table (19) to extract the excess water, then depositing them in a second serpentine dryer (21) air operated, which transfers and deposits the dry material in a cyclone (22) positioned on a dosing silo (23) that feeds a centrifugal granulator mill (24) by means of a variable speed worm, to reduce the metals in a controlled way to a homogeneous size and weight;

A cyclone (25) that receives the materials from the centrifugal granulator mill (24), in which the fine materials are eliminated towards a bag filter (26), while the metals are dispensed through an electrovalve towards a fourth conveyor belt (27) with a magnetic head at its end for the elimination of magnetic residues;

A third oscillating screen (28) that receives the material free of ferrous metals from the magnetic head, which separates the non-ferrous metals into two sizes: a small size between 0.5 to 1 mm and a medium size between 1 to 2 mm, withdrawing metals greater than 3 mm for reprocessing in the second mill (15) and fine powders of less than 0.5 mm;

A first two-way densimetric separator (29), which receives medium-sized metals and delivers clean copper through its upper outlet, and contaminated aluminum through its lower outlet, said contaminated aluminum being transferred by means of a pedestal or donkey to a second densimetric separator (30), which is calibrated differently from that of the first densimetric separator (29) that delivers clean aluminum through its upper outlet and garbage through its lower outlet, having said first (29) and second (30) separators, extractors and filters to retain any light contaminants and;

A third two-way densimetric separator (31), which receives small-size metals, which delivers clean copper through its upper outlet in a smaller size than that of the first densimetric separator (29) and contaminated aluminum through its lower outlet, being said contaminated aluminum transferred by means of a pedestal or donkey to a fourth densimetric separator (32), which is calibrated differently from that of the third densimetric separator (31) that delivers clean aluminum in a smaller size than that of the second densimetric separator (30) through its upper outlet and garbage through its lower outlet, having said third (31) and fourth (32) densimetric separators and filters to retain any light contaminant.

In a preferred embodiment of the present invention, the system also comprises a cyclone separator, located at the inlet of the bag filter (7), with a rotary valve that precipitates the heaviest minerals and metals to redirect them to a screen that classifies the materials to re-enter them towards the hammer mill (1) and; a second bag filter connected to the outlet of the bag filter (7), with a more closed fabric to retain the fine particles that escape from the bag filter (7).

In a further embodiment of the present invention, the transverse barrel feed hopper (10) comprises a vertical secondary barrel coupled to its outlet, which is connected to the extractor by means of a short pipe, which improves the suction force and avoids the recoil of separated materials.

In another embodiment of the present invention, the magnetic drum (17) is connected to a centrifugal pulverizer mill (33), which reduces and homogenizes the size of the ferrous residues, to subsequently deposit them on a screen (34) that separates the metals from the minerals.

In a further embodiment of the present invention, the first and second coil-type dryers are driven by a fan that produces an air flow between 2300 to 2900 m³/h.

The present invention has been described in accordance with a preferred embodiment; however, it will be apparent to a technician of average skill in the art that modifications can be made to the invention without departing from its spirit and scope.

The invention claimed is:

1. A system for the physical-mechanical recovery and refining of non-ferrous metals from electronic scrap, wherein the electronic scrap comprises minerals and metals, characterized in that said system comprises:

A hammer mill (1), arranged to crush electronic scrap waste to a homogeneous particle size; an air chamber (3), arranged in and connected to an outlet of the hammer mill (1), said air chamber (3) being arranged to receive crushed electronic scrap waste from the hammer mill (1) and incorporated into a wind current caused by the movement of said hammer mill (1); a separation chamber (4) having a rebound screen arranged at its bottom, said rebound screen having holes in its surface, and said separation chamber (4) being arranged to receive and disperse the crushed electronic scrap waste incorporated into the wind current in such a way that the crushed electronic scrap waste is dispersed until it hits the rebound screen, and heaviest crushed electronic scrap waste is deposited on the rebound screen, while lighter crushed electronic scrap waste is driven back towards the separation chamber (4), by a turbulence generated by the wind current coming from the hammer mill (1); a blower arranged to direct a transverse air stream with a flow of 150-250 m³/h into the separation chamber (4), thus redirecting the lighter crushed electronic scrap waste towards an outlet duct; and an extractor arranged to provide a suction flow of 1700 to 2100 m³/h, to drag said lighter crushed electronic scrap waste towards a bag filter (7);

a dosing box (8), which is connected to the separation chamber (4), aid dosing box (8) being arranged to receive the heaviest crushed electronic scrap waste that passes through the holes of the rebound screen and redirects it towards a second conveyor belt (9); a transverse barrel feed hopper (10) arranged to receive the heaviest crushed electronic scrap waste from the second conveyor belt (9), the heaviest crushed electronic scrap waste being intercepted by a transversal air current of 130-170 m³/h in said transverse barrel feed hopper (10), in such a way that lightest materials of the heaviest crushed electronic scrap waste are sent towards an outlet; an extractor (11) arranged at said outlet to generate a suction current between 1700 and 2300 m³/h, which drags the lightest materials of the heaviest crushed electronic scrap waste which are trapped by the suction current, and to redirect said lightest materials towards the bag filter (7);

A screen or retention mesh, arranged in a lower part of the transverse barrel feed hopper (10) to allow the heaviest crushed electronic scrap waste to pass through it; an oscillating screen (12) arranged to classify the heaviest crushed electronic scrap waste into three sizes: a large size that is greater than 3 mm; a medium size ranging between 1 to 3 mm and; a fine size that is less than 1 mm, wherein medium and fine-sized heaviest crushed electronic scrap waste is deposited on a third conveyor belt (16), and the heaviest crushed electronic scrap waste of large size is rejected; a cyclone (14) arranged to receive the rejected heaviest crushed electronic scrap waste of large size from the oscillating screen (12) by means of a blower (13); a second mill (15) connected to the cyclone (14) and arranged to decrease the size of the heaviest crushed electronic scrap waste of large size from the cyclone (14) and send it back to the transverse barrel feed hopper (10);

A magnetic drum (17), arranged to receive the medium and fine-sized heaviest crushed electronic scrap waste from the third conveyor belt (16); a combined rotary screen (18) in communication with the magnetic drum (17), wherein the magnetic drum (17) is further arranged to separate said medium and fine-sized heaviest crushed electronic scrap waste into ferrous metals of the heaviest crushed electronic scrap waste and non-ferrous metals of the heaviest crushed electronic scrap waste; the ferrous metals of the heaviest crushed electronic scrap waste being sent to a parallel production line, while the non-ferrous metals of the heaviest crushed electronic scrap waste are deposited on the combined rotary screen (18), and wherein the combined rotary screen (18) is arranged to remove the non-ferrous metals smaller than 1 mm, sending them to a wet densimetric table (18a) or wiffley table where a separation and treatment of fine powders is carried out to eliminate fine powders from the non-ferrous metals, then transferring the free-fine powders non-ferrous metals to a first air-operated serpentine dryer (18b), while the non-ferrous metals of medium size (1-3 mm) are sent to a second stage of the combined rotary screen (18); a rotating drum arranged in the second stage of the combined rotary screen (18) to receive the non-ferrous metals of medium size and sufficient amount of water to form a homogeneous mixture; a second densimetric table (19), arranged to receive the homogeneous mixture from said combined rotary screen (18), and remove contaminants from the homogeneous mixture of non-ferrous metals;

A rotary screen (20), arranged to receive the homogeneous mixture of non-ferrous metals with a size between 1 and 3 mm from the second densimetric table (19) and remove any excess water contained in the homogeneous mixture of non-ferrous metals; a second air-operated serpentine dryer (21) arranged to dry the homogeneous mixture of non-ferrous metals and thus obtain dry non-ferrous metals; a cyclone (22) positioned on a dosing silo (23) and arranged to receive the dry non-ferrous metals from the second air-operated serpentine dryer (21) and remove the contaminants contained in said dry non-ferrous metals, wherein free-contaminants and dry non-ferrous metals are stored in the dosing silo (23) to be fed by a variable speed worm to a centrifugal granulator mill (24), the centrifugal granulator mill (24) being arranged to reduce the free-contaminants and dry non-ferrous metals in a controlled way to a homogeneous size and weight;

A cyclone (25) arranged to receives the non-ferrous metals from the centrifugal granulator mill (24), and eliminate fine materials produced during the reduction of the free-contaminants and dry non-ferrous metals to a homogeneous size and weight, wherein said fine materials are sent towards a bag filter (26), while the non-ferrous metals are dispensed through an electrovalve towards a fourth conveyor belt (27); a magnetic head being arranged in one end of said fourth conveyor belt (27) for the elimination of magnetic residues;

A third oscillating screen (28) arranged to receives the non-ferrous metals free of magnetic residues from the magnetic head, and separate the non-ferrous metals into two sizes: a small size of 0.5 to 1 mm and a medium size that ranges between 1 to 2 mm; the non-ferrous metals greater than 3 mm being sent to the second mill (15) for reprocessing, while fine powders less than 0.5 mm are discarded;

A first two-way densimetric separator (29) having an upper outlet and a lower outlet, said first two-way densimetric separator (29) being arranged to receive and separate the medium-sized non-ferrous metals from the third oscillating screen (28), in such a way that clean copper comes out of the upper outlet, and contaminated aluminum comes out of the lower outlet, said contaminated aluminum being transferred through a pedestal or donkey to a second two-way densimetric separator (30), said second two-way densimetric separator (30) being calibrated differently than the first two-way densimetric separator (29) and arranged to receive and separate the contaminated aluminum from the first two-way densimetric separator (29), wherein said second two-way densimetric separator (30) has an upper outlet through which clean aluminum comes out and a lower outlet through which garbage comes out; and A third two-way densimetric separator (31) having an upper outlet and a lower outlet, said third two-way densimetric separator (31) being arranged to receive and separate the small size non-ferrous metals from the third oscillating screen (28) in such a way that clean copper comes out of the upper outlet, and aluminum contaminated comes out of the lower outlet, said clean copper having a smaller size than the size of the clean copper that comes out of the first densimetric separator (29), and said contaminated aluminum being transferred by means of a pedestal or donkey to a fourth two-way densimetric separator (32), said fourth two-way densimetric separator (32) being calibrated differently than the third two-way densimetric separator (31) and arranged to receive and separate the contaminated aluminum from the third two-way densimetric separator (31), wherein said fourth two-way densimetric separator (32) has an upper outlet through which clean aluminum comes out, and a lower outlet through which garbage comes out, said clean aluminum having a smaller size than the size of the clean aluminum that comes out of the second two-way densimetric separator (30).

2. The system according to claim 1, characterized in that the first (29), second (30), third (31) and fourth (32) two-way separators have extractors and filters to retain any light contaminant.

3. The system according to claim 1, further comprising a first controlled feeding conveyor belt (2) arranged to feed electronic scrap waste into the hammer mill (1).

4. The system according to claim 1 characterized in that the air chamber (3) has a substantially rectangular shape.

5. The system according to claim 1 characterized in that the separation chamber (4) is connected through a bell (5) to the air chamber (3), in such a way that the crushed electronic scrap waste is dispersed in the separation chamber (4) in an area between 0.7 and 1.3 $m^3$.

6. The system according to claim 1 characterized in that the holes of the rebound screen have a size of 12-17 mm.

7. The system according to claim 1, characterized in that the screen or retention mesh has a motovibrator that avoids material jamming.

8. The system according to claim 1, further comprising a cyclone separator arranged in an inlet of the bag filter (7) to precipitate the heaviest minerals and metals that may remain in the lighter electronic scrap waste; a rotary valve arranged in the cyclone separator to redirect said heaviest minerals and metals to a screen, said screen being arranged to classify said heaviest metals and minerals and send them back to the hammer mill (1) and; a second bag filter connected to the outlet of the bag filter (7), said second bag filter being arranged to retain the lighter crushed electronic scrap waste that could escape from the bag filter (7).

9. The system according to claim 1, characterized in that the transverse barrel feed hopper (10) comprises a vertical secondary barrel coupled to its outlet, said secondary vertical barrel being connected to the extractor (11) by means of a short pipe, to improve the suction force and prevent lightest materials of the heaviest crushed electronic scrap waste from returning to the outlet of the barrel feed hopper (10).

10. The system according to claim 1, characterized in that the magnetic drum (17) is connected to a centrifugal pulverizer mill (33), which reduces and homogenizes the size of the ferrous metals of the heaviest crushed electronic scrap waste to subsequently deposit them on a screen (34), said screen (34) being arranged to separate metals from minerals.

11. The system according to claim 1, characterized in that the first (18b) and second (21) serpentine dryers are driven by a fan that produces an air flow of 2300-2900 $m^3/h$.

* * * * *